(12) United States Patent
Yokoi et al.

(10) Patent No.: US 11,309,824 B2
(45) Date of Patent: Apr. 19, 2022

(54) MOTOR DEVICE

(71) Applicant: TSUBAKIMOTO CHAIN CO., Osaka (JP)

(72) Inventors: Yoshiaki Yokoi, Osaka (JP); Haruki Teramukai, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 16/981,371

(22) PCT Filed: Jan. 30, 2019

(86) PCT No.: PCT/JP2019/003103
§ 371 (c)(1),
(2) Date: Sep. 16, 2020

(87) PCT Pub. No.: WO2019/181219
PCT Pub. Date: Sep. 26, 2019

(65) Prior Publication Data
US 2021/0075360 A1 Mar. 11, 2021

(30) Foreign Application Priority Data
Mar. 19, 2018 (JP) .............................. JP2018-051248

(51) Int. Cl.
*H02P 29/024* (2016.01)

(52) U.S. Cl.
CPC .................................. *H02P 29/024* (2013.01)

(58) Field of Classification Search
CPC ........ H02P 29/024; H02H 5/042; H02H 3/42; H02H 7/085

(Continued)

(56) References Cited

U.S. PATENT DOCUMENTS 5,386,945 A 2/1995 Nose et al.
6,252,752 B1* 6/2001 Nagahama ........... H02H 7/0816
361/24

(Continued)

FOREIGN PATENT DOCUMENTS

EP  3 331 135 A1  6/2018
JP  51-31847 A    3/1976

(Continued)

OTHER PUBLICATIONS

International Search Report dated May 7, 2019, issued in counterpart International Application No. PCT/JP2019/003103 (2 pages).

(Continued)

*Primary Examiner* — David Luo
(74) *Attorney, Agent, or Firm* — Westerman, Hattori, Daniels & Adrian, LLP

(57) ABSTRACT

A gear motor (motor device) comprising a three-phase motor and a terminal box housing a power supply connection terminal for connecting the three phase motor to an alternating current power supply, comprises: a power detection circuit that detects power to be supplied to the three-phase motor; a control unit that executes predetermined control if a load abnormality related to the three-phase motor or a driven device is detected based on power detected by the power detection circuit. The power detection circuit and the control unit are housed in the terminal box.

11 Claims, 9 Drawing Sheets

(58) Field of Classification Search
USPC .................................................. 318/434, 34
See application file for complete search history.

(56) References Cited

U.S. PATENT DOCUMENTS

| | | | | |
|---|---|---|---|---|
| 7,692,394 | B2* | 4/2010 | Hill | G11B 19/20 |
| | | | | 318/139 |
| 8,179,064 | B2* | 5/2012 | Li | H02K 11/215 |
| | | | | 318/400.09 |
| 8,624,536 | B2* | 1/2014 | Zhao | H02K 11/20 |
| | | | | 318/490 |
| 2009/0189559 | A1 | 7/2009 | Li | |

FOREIGN PATENT DOCUMENTS

| | | |
|---|---|---|
| JP | 5-122985 A | 5/1993 |
| JP | 5-312854 A | 11/1993 |
| JP | 6-91186 A | 4/1994 |
| JP | 8-149885 A | 6/1996 |
| JP | 2000-180480 A | 6/2000 |
| JP | 2011-115025 A | 6/2011 |
| JP | 2014-124062 A | 7/2014 |
| JP | 2015-199149 A | 11/2015 |
| JP | 2015-231675 A | 12/2015 |
| JP | 2016-116273 A | 6/2016 |
| TW | 201705653 A | 2/2017 |

OTHER PUBLICATIONS

Extended (Supplementary) European Search Report dated Nov. 25, 2021, issued in counterpart EP application No. 19770492.7. (7 pages).

* cited by examiner

MOTOR DEVICE

CROSS-REFERENCE TO RELATED APPLICATIONS

This application is the national phase under 35 U.S.C. § 371 of PCT International Application No. PCT/JP2019/003103 which has an International filing date of Jan. 30, 2019 and designated the United States of America.

FIELD

The present disclosure relates to a motor device that includes a power detection circuit housed in a terminal box for a motor and is capable of accurately detecting an abnormality in load (hereinafter also referred to as a load abnormality).

BACKGROUND

A gear motor includes a motor, a reduction gear for reducing and outputting the rotations of the motor, and an overload protection circuit. The gear motor is used as a power source for a belt conveyor, for example. The overload protection circuit detects current flowing through the motor to monitor overload on the motor or overload on a driven device such as a belt conveyor or the like driven by the gear motor. If overload is detected, the overload protection circuit shuts off the power supply to the motor to stop the motor and the driven device.

Japanese Patent Application Laid-Open Publication No. 2011-115025 discloses a gear motor that performs overload protection by detecting current as described.

Japanese Patent Application Laid-Open Publication No. H5-312854 discloses a power detection device that detects single-phase line-to-line voltage and phase current, and calculates a power factor based on the phase difference between the voltage and the current to obtain three-phase alternating power.

In order to detect the line-to-line voltage, a transformer is used.

Japanese Patent Application Laid-Open Publication No. H5-122985 discloses a motor information terminal device that calculates a load condition based on detection signals from a temperature sensor and a vibration sensor provided in a motor.

SUMMARY

Japanese Patent Application Laid-Open Publication No. 2011-115025 discloses that overload is detected by detecting current, though mere monitoring of current can fail to detect a load abnormality. In the case where a gear motor is used as a power source for a belt conveyor, a motor having higher output than a required power is often selected taking the safety margin into consideration. In the case where a high-power motor is used for the belt conveyor, operation is made at a low load factor area for the motor, that is, an area with a value less than the rated current value. Here, even if an abnormal overload condition occurs on the belt conveyor side, change in current is small due to the characteristics of the motor, which may prevent appropriate detection of overload (see FIG. 5). The current value of the motor changes depending on the variation in a power supply voltage as well, which prevents accurate detection of overload (see FIG. 6).

Meanwhile, miniaturization of the gear motor is required to prevent the overload protection circuit from interfering with the driven device.

An object of the present disclosure is to provide a motor device that can accurately detect a load abnormality related to a motor or a driven device even in the light load area independent of variation in the power supply voltage, while eliminating the need for disposing outside thereof an additional circuit device which may cause interference with the driven device.

A motor device according to the present disclosure is a motor device comprising a motor and a terminal box housing a connection terminal for connecting the motor to an alternating current power supply, and comprises: a power detection circuit that detects power to be supplied to the motor; and a control unit that executes predetermined control if a load abnormality related to the motor or a driven device that is driven by torque of the motor is detected based on power detected by the power detection circuit, and the power detection circuit and the control unit are housed in the terminal box.

In the present disclosure, a load abnormality of the motor or the driven device is detected by detecting power supplied to the motor. The load abnormality includes a low-load condition where the load is below a predetermined low limit value as well as a high-load condition where the load is above a predetermined upper limit value. A load abnormality is detected by detecting power, which makes it possible to accurately detect an abnormality in load related to the motor or the driven device even in the light-load area independent of the variation in the power supply voltage (see FIG. 5 and FIG. 6).

Furthermore, the power detection circuit and the control unit are housed in the terminal box, which eliminates the need for disposing outside thereof an additional circuit device that may cause interference with the driven device, and enables miniaturization of the motor device.

In the motor device according to the present disclosure, the motor includes three-phase coils that are star-connected to three-phase alternating current power supply connection terminals, and the power detection circuit includes three resistors that are star-connected to the three-phase alternating current power supply connection terminals, a voltage detection unit that detects voltage across one of the resistors corresponding to phase voltage of one of the coils, and a current detection unit that detects phase current flowing through the one of the coils. The control unit calculates power supplied to the motor based on the voltage across the one of the resistors and the phase current flowing through the one of the coils.

In the present disclosure, power supplied to the motor may be calculated with a small circuit configuration without a transformer. The elimination of the transformer, which is a large component, makes it possible to house the power detection circuit in the terminal box with a margin.

The motor device according to the present disclosure further comprises a circuit breaker that shuts off power supply to the motor, and the control unit controls the circuit breaker so as to be in an open state if a load abnormality is detected.

In the present disclosure, if a load abnormality is detected by detecting power, the circuit breaker is set to an open state to thereby shut off the power supply to the motor.

In the motor device according to the present disclosure, the control unit outputs a signal indicating an abnormality in load if a load abnormality is detected.

In the present disclosure, if a load abnormality is detected by detecting power, a signal indicating an abnormality in load can be output to the outside. In other words, it is possible to report a load abnormality to the outside in one form or another.

The motor device according to the present disclosure further comprises a vibration detection unit that detects vibration of the motor device, and the control unit detects an abnormality of the motor device or a driven device that is driven by a torque of the motor based on a detection result of the vibration detection unit together with power detected by the power detection circuit.

In the present disclosure, the vibration of the motor device is detected together with the power supplied to the motor, whereby a load abnormality can be detected more accurately.

The motor device according to the present disclosure further comprises a reduction gear that reduces and outputs rotation of the motor, and the vibration detection unit is disposed at the motor, the reduction gear or a connected portion between the motor and the reduction gear.

In the present disclosure, an abnormality in vibration at the motor, the reduction gear, or the connected portion between the motor and the reduction gear is detected, whereby a load abnormality can be detected.

The motor device according to the present disclosure further comprises a temperature detection unit that detects temperature of the motor device, and the control unit detects an abnormality of the motor device or a driven device that is driven by a torque of the motor based on a detection result of the temperature detection unit together with power detected by the power detection circuit.

In the present disclosure, the temperature of the motor device is detected together with the power supplied to the motor, whereby a load abnormality can be detected more accurately.

The motor device according to the present disclosure further comprises a reduction gear that reduces and outputs rotation of the motor, and the temperature detection unit is disposed at the motor, the reduction gear or a connected portion between the motor and the reduction gear.

In the present disclosure, an abnormality in temperature at the motor, the reduction gear, or the connected portion between the motor and the reduction gear is detected, whereby a load abnormality can be detected.

The motor device according to the present disclosure further comprises a vibration detection unit that detects vibration of the motor device; a temperature detection unit that detects temperature of the motor device; and a circuit breaker that shuts off power supply to the motor, and the control unit controls the circuit breaker so as to be in an open state if power detected by the power detection circuit is above a predetermined power upper limit threshold or is below a power lower limit threshold, if vibration detected by the vibration detection unit is above a predetermined vibration threshold, or if temperature detected by the temperature detection unit is above a predetermined temperature threshold.

In the present disclosure, the vibration and the temperature of the motor device are detected together with the power supplied to the motor, whereby a load abnormality can be detected more accurately. If a load abnormality is detected, the power supply to the motor can be shut off.

The motor device according to the present disclosure further comprises a threshold setting switch for setting a power upper limit threshold or a power lower limit threshold to detect overload or light load, and the control unit detects a load abnormality by comparing a power upper limit threshold or a power lower limit threshold set by the threshold setting switch with power detected by the power detection circuit.

In the present disclosure, by the threshold setting switch, a power upper limit threshold or a power lower limit threshold for detecting a load abnormality can be set.

The motor device according to the present disclosure further comprises a communication unit that receives a plurality of power upper limit thresholds or a plurality of power lower limit thresholds set by the threshold setting switch; and a threshold storing unit that stores the plurality of power upper limit thresholds or the plurality of power lower limit thresholds received by the communication unit in association with a setting value of the threshold setting switch, and the control unit detects a load abnormality by reading out from the threshold storing unit a power upper limit threshold or a power lower limit threshold corresponding to a setting value of the threshold setting switch, and comparing the power upper limit threshold or the power lower limit threshold that is read out with power detected by the power detection circuit.

In the present disclosure, the user can assign a power upper limit threshold or a power lower limit threshold for detecting a load abnormality to each of the setting values corresponding to the state of the threshold setting switch through the communication unit. Thus, the user can easily switch the threshold between the power upper limit threshold and the power lower limit threshold by selecting a desired setting value through switching of the threshold setting switch.

The motor device according to the present disclosure further comprises a log storing unit that stores a plurality of recent power values intermittently detected by the power detection circuit.

In the present disclosure, the multiple recent power values that are intermittently detected by the power detection circuit can be stored as log information. The log information can be used as information for specifying the cause of abnormality in load.

According to the present disclosure, it is possible to accurately detect an abnormality in load related to the motor or the driven device even in a light load area independent of variation in the power supply voltage, and detect the above-described load abnormality without the need for disposing outside an additional circuit device which may cause interference with the driven device.

The above and further objects and features will more fully be apparent from the following detailed description with accompanying drawings.

DETAILED DESCRIPTION

The present disclosure will be described below with reference to the drawings depicting embodiments.

Figure 1:
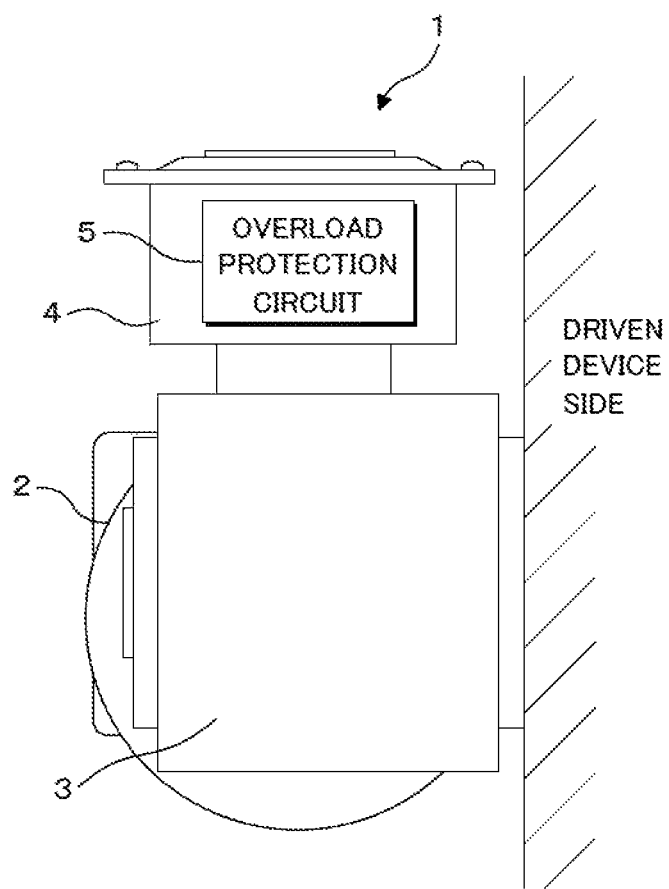
FIG. 1 is a side view illustrating one example of a gear motor.

FIG. 1 is a side view illustrating one example of a gear motor 1. The gear motor 1 according to the present embodiment is provided with a three-phase motor 2, a reduction gear 3, a terminal box 4 and an overload protection circuit 5. The gear motor 1 is one example of the motor device according to the present disclosure.

The three-phase motor 2 includes three-phase coils that are star-connected to each other, a rotor that rotates by alternating current flowing through the three-phase coils and a rotary shaft that outputs the torque of the rotor.

The reduction gear 3 is coupled to the rotary shaft of the three-phase motor 2, and has a gear mechanism and an output shaft for outputting the torque of the three-phase motor 2 while reducing the rotation of the rotary shaft. The gear mechanism is a known reduction gear mechanism such as a helical gear mechanism, a hypoid gear mechanism, a worm gear mechanism or the like.

The terminal box 4 is a hollow housing having a substantially rectangular parallelepiped shape for housing various terminals related to driving of the three-phase motor 2, and is provided at an appropriate position on a side surface of the casing of the three-phase motor 2. The terminal box 4 is formed to have a lateral width when viewed from the direction of the central line of the three-phase motor 2 smaller than the diameter of the casing of the three-phase motor 2 so as not to interfere with the driven device provided with the gear motor 1. Naturally, it is preferable that the terminal box 4 also has a small longitudinal width.

The overload protection circuit 5 according to the present embodiment is a circuit for detecting a load abnormality of the three-phase motor 2 or the driven device by detecting the power supplied to the three-phase motor 2. The overload protection circuit 5 is housed in the terminal box 4.

Figure 2:
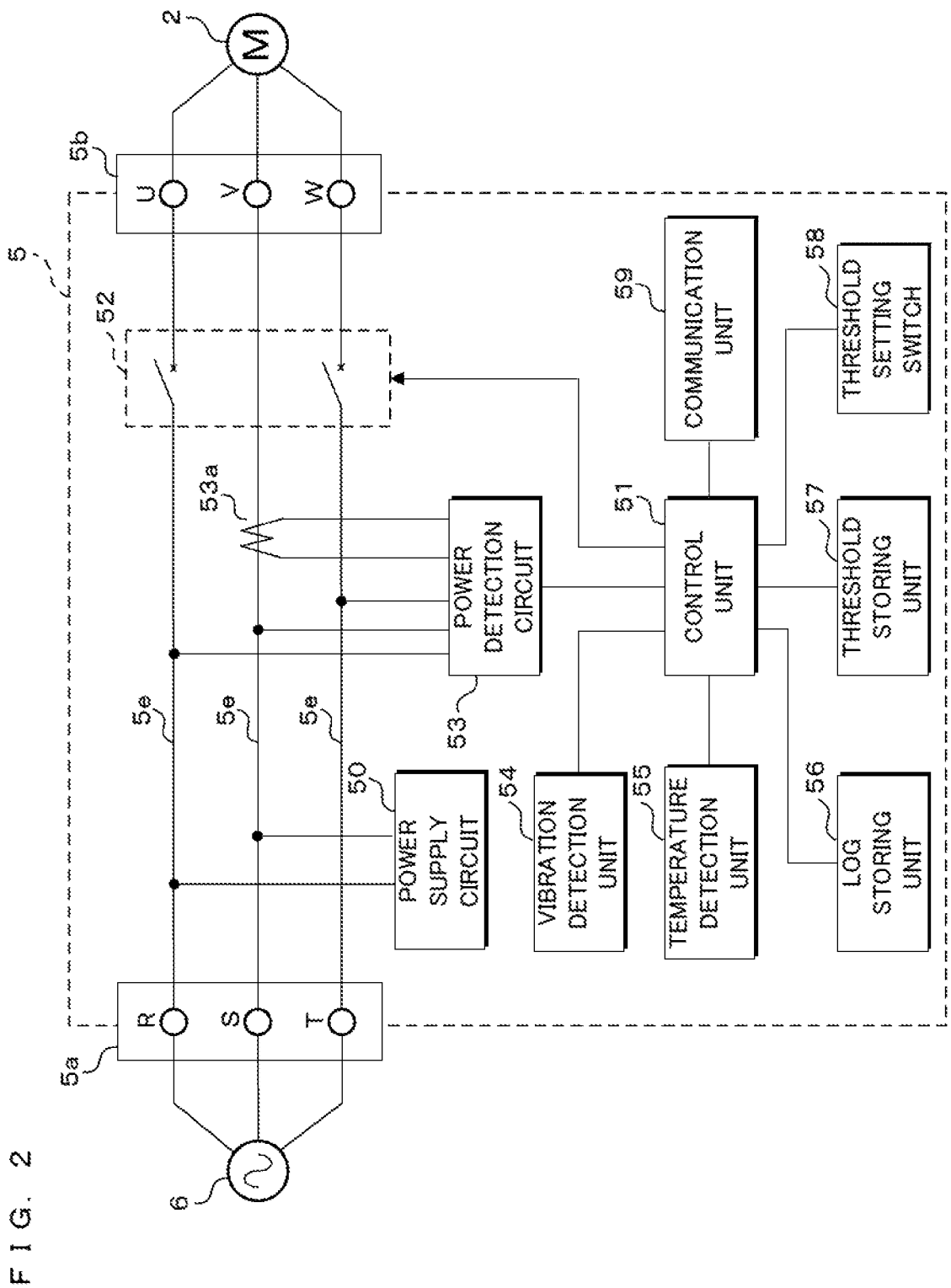
FIG. 2 is a circuit block diagram illustrating one example of an overload protection circuit.
Figure 3A:
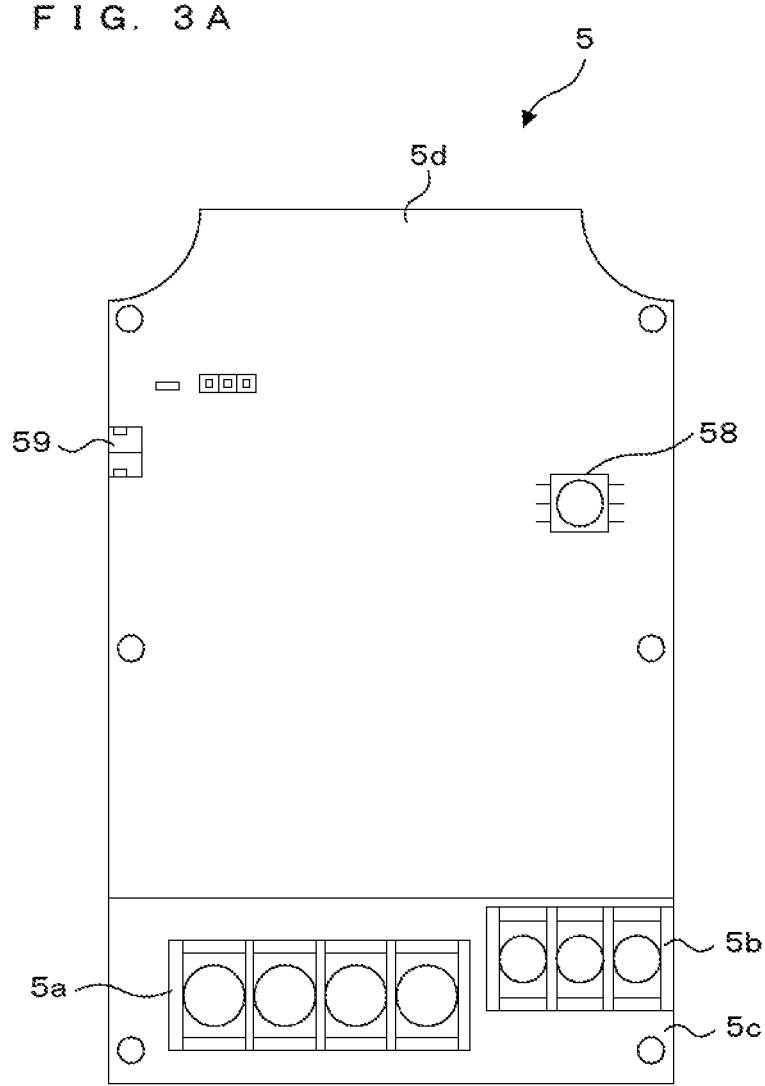
FIG. 3A is a schematic view illustrating one example of a circuit board of the overload protection circuit.
Figure 3B:
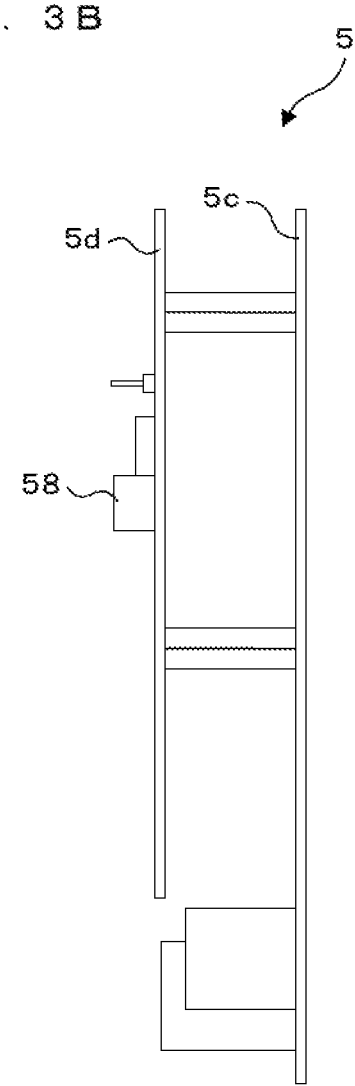
FIG. 3B is a schematic view illustrating one example of a circuit board of the overload protection circuit.

FIG. 2 is a circuit block diagram illustrating one example of the overload protection circuit 5. FIGS. 3A and 3B are schematic views each illustrating one example of a circuit board of the overload protection circuit 5. The overload protection circuit 5 is provided with a power supply connection terminal 5a, a motor connection terminal 5b, a power supply circuit 50, a control unit 51, a circuit breaker 52, a power detection circuit 53, a vibration detection unit 54, a temperature detection unit 55, a log storing unit 56, a threshold storing unit 57, a threshold setting switch 58 and a communication unit 59. It is noted that the log storing unit 56 and the threshold storing unit 57 may be formed by a memory which is a single hardware though they are separately illustrated as function units.

As illustrated in FIG. 3B, the overload protection circuit 5 has a substantially rectangular first circuit board 5c and a substantially rectangular second circuit board 5d that are disposed in two layers. The first circuit board 5c corresponds to a lower parent substrate, while the second circuit board 5d corresponds to an upper child substrate. The power supply connection terminal 5a is disposed at a region closer to one short side of the first circuit board 5c. Furthermore, on the first circuit board 5c, the motor connection terminal 5b, the power supply circuit 50, the circuit breaker 52, the power detection circuit 53 and the like are disposed. The threshold setting switch 58 is disposed at a region closer to one long side of the second circuit board 5d while the communication unit 59 is disposed at a region closer to the other long side thereof. Moreover, on the second circuit board 5d, the control unit 51, the log storing unit 56, the threshold storing unit 57 and the like are disposed.

The power supply connection terminal 5a is provided with three terminals for connecting the gear motor 1 to an alternating current (AC) power supply 6 for outputting three-phase alternating voltage. The motor connection terminal 5b is provided with three terminals connected to the three-phase motor 2. The three terminals forming the motor connection terminal 5b and the three terminals forming the power supply connection terminal 5a are connected, respectively, by electric supply lines 5e.

Figure 4:
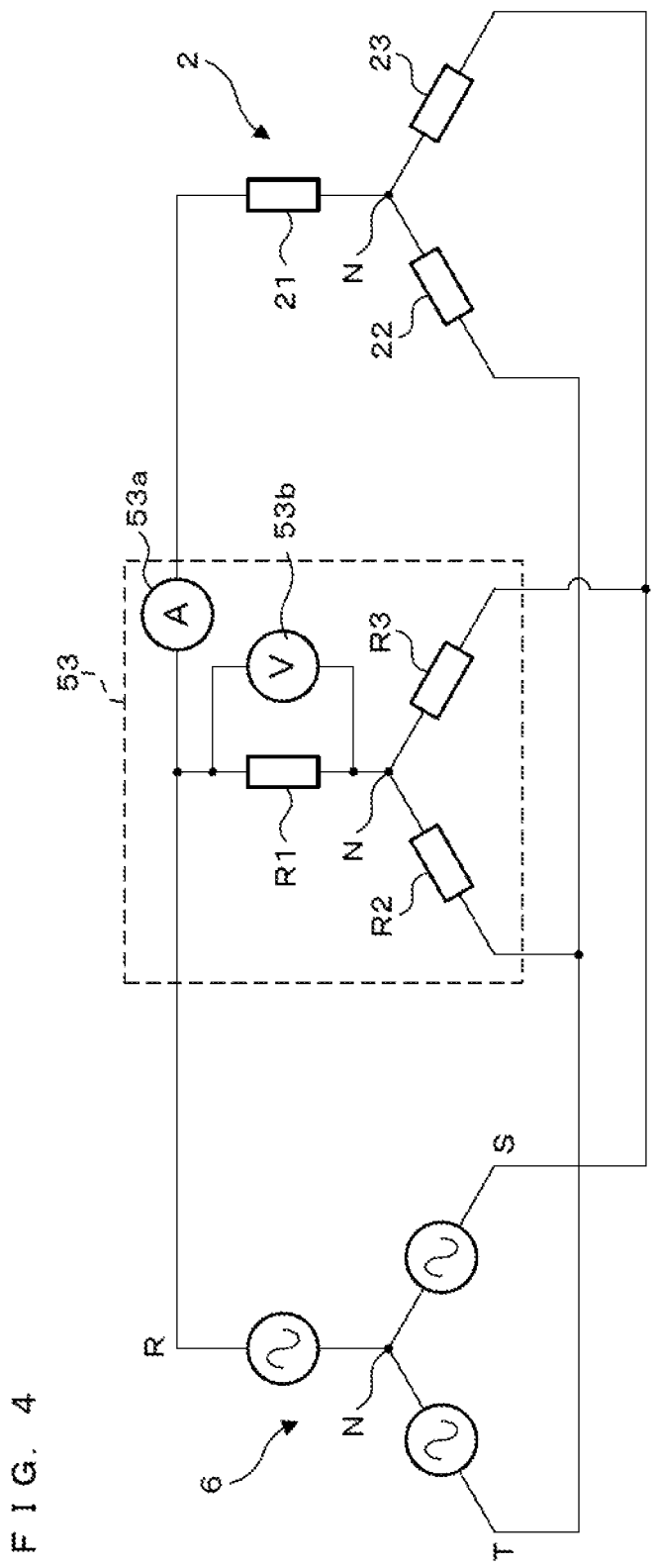
FIG. 4 is a circuit diagram illustrating one example of a power detection circuit.

The three-phase motor 2 connected to the motor connection terminal 5b has a U phase coil 21, a V phase coil 22 and a W phase coil 23 that are star-connected to each other (see FIG. 4). Each of the U phase coil 21, the V phase coil 22 and the W phase coil 23 is wound on a stator, for example. When alternating voltage is applied to the U phase coil 21, the V phase coil 22 and the W phase coil 23, a rotating magnetic field is generated. A rotor is rotated by the rotating magnetic field to output torque.

To the power supply connection terminal 5a, the power supply circuit 50 is connected that converts alternating voltage applied to the three-phase motor 2 into voltage for driving the overload protection circuit 5 and supplies the converted voltage to the respective components. The power supply circuit 50 has, for example, a transformer for stepping down alternating voltage of the AC power supply 6, a rectifier circuit for rectifying the alternating voltage stepped down by the transformer and a regulator for stabilizing direct current voltage rectified by the rectifier circuit.

The control unit 51 is a microcomputer having a central processing unit (CPU), a read only memory (ROM), a random access memory (RAM), a timer unit, an input-output interface and the like. The control unit 51 controls the operation of the respective components to execute processing of detecting an abnormality in load of the three-phase motor 2 or the driven device by power. Furthermore, if detecting an abnormality, the control unit 51 executes processing of shutting off the power supply to the three-phase motor 2, reporting the abnormality to the outside or the like. A part or all of the control unit 51 may be formed by a custom large scale integration (LSI), a field-programmable gate array (FPGA), or the like.

The circuit breaker 52 is a switch for shutting off the power supply from the AC power supply 6 to the three-phase motor 2. The circuit breaker 52 is a solid-state relay such as a triac or the like provided at the electric supply line 5e for each of the U phase and W phase. It is noted that the location of the switch for the circuit breaker 52 is not particularly limited to the U phase and the W phase wires. The circuit breaker 52 is normally in a closed state, and controlled between an open state and a closed state by the control of the control unit 51.

The power detection circuit 53 is a circuit for detecting power to be supplied to the three-phase motor 2 by detecting single phase voltage and single phase current.

FIG. 4 is a circuit diagram illustrating one example of the power detection circuit 53. The circuit on the left is an equivalent circuit for the AC power supply 6, and is represented by a power supply for outputting AC voltage of a first phase (R), a power supply for outputting AC voltage of a second phase (S) and a power supply for outputting AC voltage of a third phase (T) of alternating current relative to the reference voltage of a neutral point N.

The circuit on the right is an equivalent circuit for the three-phase motor 2, and is represented by the U phase coil 21, the V phase coil 22 and the W phase coil 23 that are star-connected to each other and each include a predetermined resistance. In FIG. 4, resistance components of the respective coils are focused and illustrated as resistors.

More specifically, one end of each of the U phase coil 21, the V phase coil 22 and the W phase coil 23 is connected to a common neutral point N, while the other end of the U phase coil 21 is connected to a U phase terminal, the other end of the V phase coil 22 is connected to a V phase terminal, and the other end of the W phase coil 23 is connected to the W phase terminal.

The power detection circuit 53 is a circuit having resistance components similar to those of the three-phase motor 2. More specifically, the power detection circuit 53 has a first resistor R1, a second resistor R2 and a third resistor R3 that are star-connected to respective three terminals of the power supply connection terminal 5*a* or the motor connection terminal 5*b*. One end of each of the first resistor R1, the second resistor R2 and the third resistor R3 is connected to a common neutral point N, while the other end of the first resistor R1 is connected to a first phase (R) terminal and the U phase terminal, the second resistor R2 is connected to a second phase (S) terminal and the V phase terminal, and the other end of the third resistor R3 is connected to a third phase (T) terminal and the W phase terminal. The ratio of the resistance values among the first resistor R1, the second resistor R2 and the third resistor R3 is approximately the same as the ratio of the resistance values among the U phase coil 21, the V phase coil 22 and the W phase coil 23. For example, if the U phase coil 21, the V phase coil 22 and the W phase coil 23 have the same resistance value, the first resistor R1, the second resistor R2 and the third resistor R3 have the same resistance value.

Moreover, the power detection circuit 53 is provided with a voltage detection unit 53*b* for detecting voltage across the first resistor R1 corresponding to the phase voltage of the U phase coil 21 and a current detection unit 53*a* for detecting phase current flowing through the U phase coil 21. The voltage across the first resistor R1 will be referred to as phase current below. The power detection circuit 53 calculates a power factor by the phase difference between the phase voltage and the phase current detected by the voltage detection unit 53*b* and the current detection unit 53*a* respectively, to evaluate power of a single phase. Then, the power detection circuit 53 triples the power of a single phase to calculate power to be supplied to the three-phase motor 2 and outputs the information indicating the power obtained through the calculation to the control unit 51. The power to be supplied to the three-phase motor 2 is represented by the following equation.

$$P = 3 \times Ve \times Ie \times \cos\theta \quad (1)$$

where
Ve: effective value of phase voltage
Ie: effective value of phase current
cosθ: power factor
θ: phase difference between phase voltage and phase current The vibration detection unit 54 is a triaxial acceleration sensor, for example, and detects acceleration in each axis direction to output the information indicating the acceleration in each axis direction to the control unit 51. The vibration detection unit 54 is disposed at the casing of the three-phase motor 2.

It is noted that the provision of the triaxial acceleration sensor is one example of the vibration detection unit 54, and a known vibration sensor may be used. Moreover, the location of the vibration detection unit 54 is not necessarily limited to the casing of the three-phase motor 2, and may be provided at the connected portion between the three-phase motor 2 and the reduction gear 3. Alternatively, the vibration detection unit 54 may be provided at the reduction gear 3. Naturally, multiple vibration detection units 54 may be provided at multiple sites of the gear motor 1.

The temperature detection unit 55 is provided with a thermistor, for example. The thermistor of the temperature detection unit 55 is disposed at the casing of the three-phase motor 2, for example. The temperature detection unit 55 detects the voltage across the thermistor, converts the detected voltage across the thermistor into temperature, and outputs the information indicating the temperature to the control unit 51.

It is noted that the provision of the thermistor is one example of the temperature detection unit 55, and any known temperature sensor may be used such as a resistance thermometer, a semiconductor temperature sensor, a thermocouple, or the like. Moreover, the location of the temperature detection unit 55 is not necessarily limited to the casing of the three-phase motor 2, and may be provided at the connected portion between the three-phase motor 2 and the reduction gear 3. Alternatively, the temperature detection unit 55 may be provided at the reduction gear 3. Naturally, multiple temperature detection units 55 may be provided at multiple sites of the gear motor 1.

The log storing unit 56 is a nonvolatile memory such as an electrically erasable programmable ROM (EEPROM), a flash memory or the like, and stores information indicating temporal changes of phase voltage, phase current and power detected by the power detection circuit 53, acceleration detected by the vibration detection unit 54, temperature detected by the temperature detection unit 55, etc. The control unit 51 intermittently obtains information on the phase voltage, phase current and power from the power detection circuit 53 at a sampling interval set by the user, and stores the information obtained during a recent predetermined time period. For example, the control unit 51 obtains the information on the phase voltage, phase current and power when twenty pieces of information are reached, and stores them in the log storing unit 56. Similarly, the control unit 51 intermittently obtains information on the acceleration and temperature from the vibration detection unit 54 and the temperature detection unit 55 respectively, and stores the information obtained during a recent predetermined time period.

The threshold storing unit 57 is a nonvolatile memory such as an EEPROM or the like similarly to the log storing unit 56, and stores various thresholds for detecting an abnormality in load in the three-phase motor 2 or the driven device. For example, the threshold storing unit 57 stores information such as a power upper limit threshold for defining an upper limit of load, a power lower limit threshold for defining a lower limit of load, a vibration threshold for detecting a load abnormality by vibration, a temperature threshold for detecting a load abnormality by temperature, and a sampling interval of the detected values. The threshold storing unit 57 can store multiple sets of combinations of the thresholds.

The threshold setting switch 58 is a switch for appropriately changing the combinations of the thresholds stored in the threshold storing unit 57. For example, the threshold setting switch 58 is a rotary switch, and the user switches the threshold setting switch 58 to select a setting value "0," "1," "2," "3" or the like. The threshold storing unit 57 stores the above-mentioned combinations of the thresholds in association with the respective setting values "0," "1," "2" and "3."

The communication unit 59 has a USB port for communicating with, for example, an external device such as a computer. The control unit 51 transmits and receives information to and from the external device via the communication unit 59. For example, the control unit 51 can receive information indicating a combination between various thresholds and a setting value input by the computer through the communication unit 59, and store the information in the threshold storing unit 57 by bringing the setting value and the thresholds into association with each other.

Furthermore, the control unit 51 transmits the log information on the detected values of the power, phase voltage, phase current, vibration, temperature and the like stored in the log storing unit 56 to the external computer through the communication unit 59.

Moreover, the control unit 51 may be configured to output a signal indicating an abnormality in load to the outside through the communication unit 59 if a load abnormality is detected.

Figure 5:
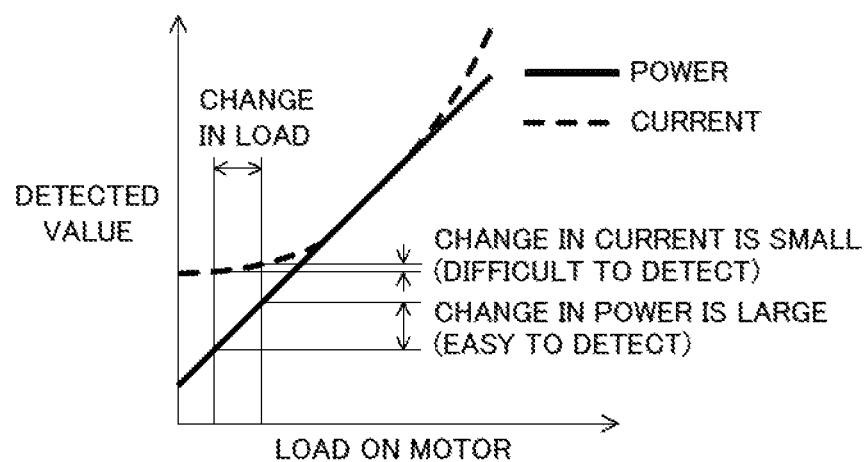
FIG. 5 is a graph showing a relation between the load on the motor in a light load area and current as well as power.

FIG. 5 is a graph showing a relation between the load on the motor in the light load area and current as well as power. The horizontal axis indicates the load on the motor while the vertical axis indicates a detection value of power or current supplied to the three-phase motor 2. The bold line indicates power while the broken line indicates current. In the area of a low load indicated by the two-directional arrow of "changes in load," the amount of change in current with respect to the amount of change in load on the motor is small, which makes it difficult to detect a load abnormality by detecting current in the area. In contrast thereto, the amount of change in power with respect to the amount of change in load on the motor is large, which makes it possible to detect a load abnormality by monitoring power in the area.

Figure 6:
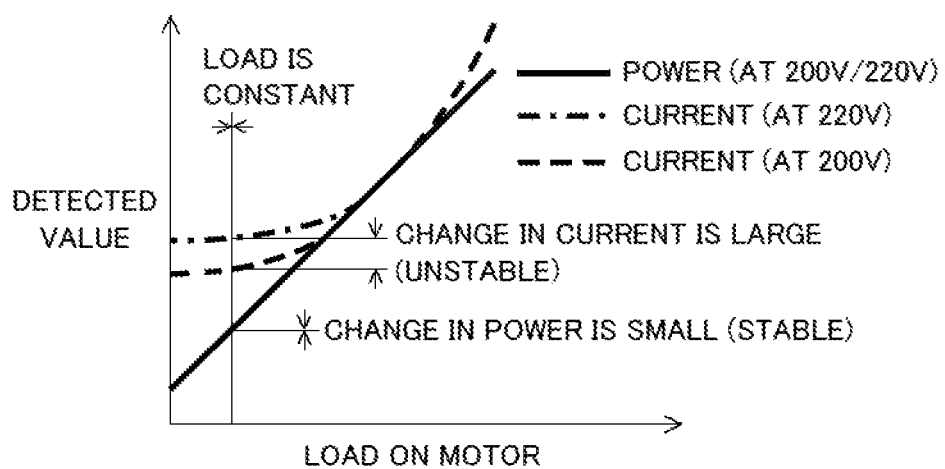
FIG. 6 is a graph showing a relation between the load on the motor when power supply voltage varies and current as well as power.

FIG. 6 is a graph showing a relation between the load on the motor when power supply voltage varies and current as well as power. The horizontal axis indicates the load on the motor while the vertical axis indicates a detection value of power or current supplied to the three-phase motor 2. The bold line indicates power while the broken line and the dot-and-dash line indicate current. As illustrated in FIG. 6, when the voltage of the AC power supply 6 changes, the current changes accordingly. The broken line represents the current upon application of a voltage of 200 V while the dot-and-dash line represents the current upon application of a voltage of 220 V. In the situation where the power supply voltage changes, the current may change accordingly, which prevents correct detecting of the load on the motor by detecting current. In contrast thereto, the power is not substantially affected even if the voltage of the AC power supply 6 changes, which allows for stable detecting of the load on the motor.

As described above, the overload protection circuit 5 according to the present embodiment can accurately detect a load abnormality related to the three-phase motor 2 or the driven device by detecting power even in the light load area independent of variation in the power supply voltage.

The control unit 51 detects a load abnormality by comparing the power detected by the power detection circuit 53 and the power upper limit threshold as well as the power lower limit threshold. More specifically, the control unit 51 determines the presence of a load abnormality if the power detected by the power detection circuit 53 is above the power upper limit threshold or is below the power lower limit threshold.

Moreover, the control unit 51 determines the presence of a load abnormality if the vibration detected by the vibration detection unit 54 is equal to or larger than a vibration threshold, or if the temperature detected by the temperature detection unit 55 is equal to or larger than a temperature threshold in addition to the determination of the load abnormality by using power. It is noted that the control unit 51 may totally determine a load abnormality using the detected power, vibration and temperature. For example, the control unit 51 may calculate the differences between the power, vibration and temperature and their thresholds, calculate the average or the weighted average of the differences as an index value for indicating a load abnormality, and compare the index value and a predetermined threshold to thereby determine an abnormality in load. If a load abnormality is detected, the control unit 51 outputs an open signal to the circuit breaker 52 to shut off the power supply to the three-phase motor 2. Furthermore, a signal indicating an abnormality in load is output to the outside through the communication unit 59.

Figure 7:
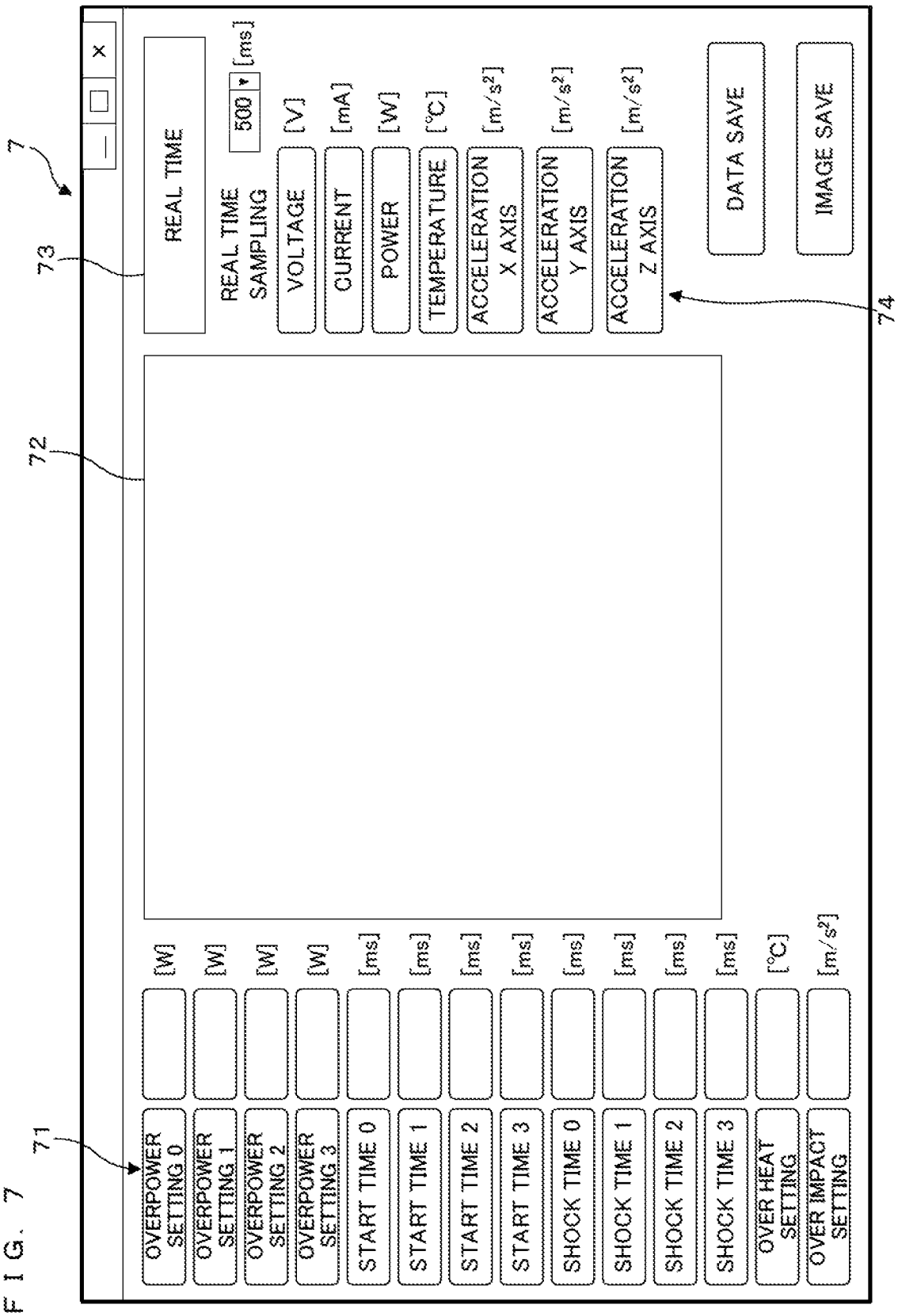
FIG. 7 is a schematic view illustrating one example of a threshold setting screen.
Figure 8:
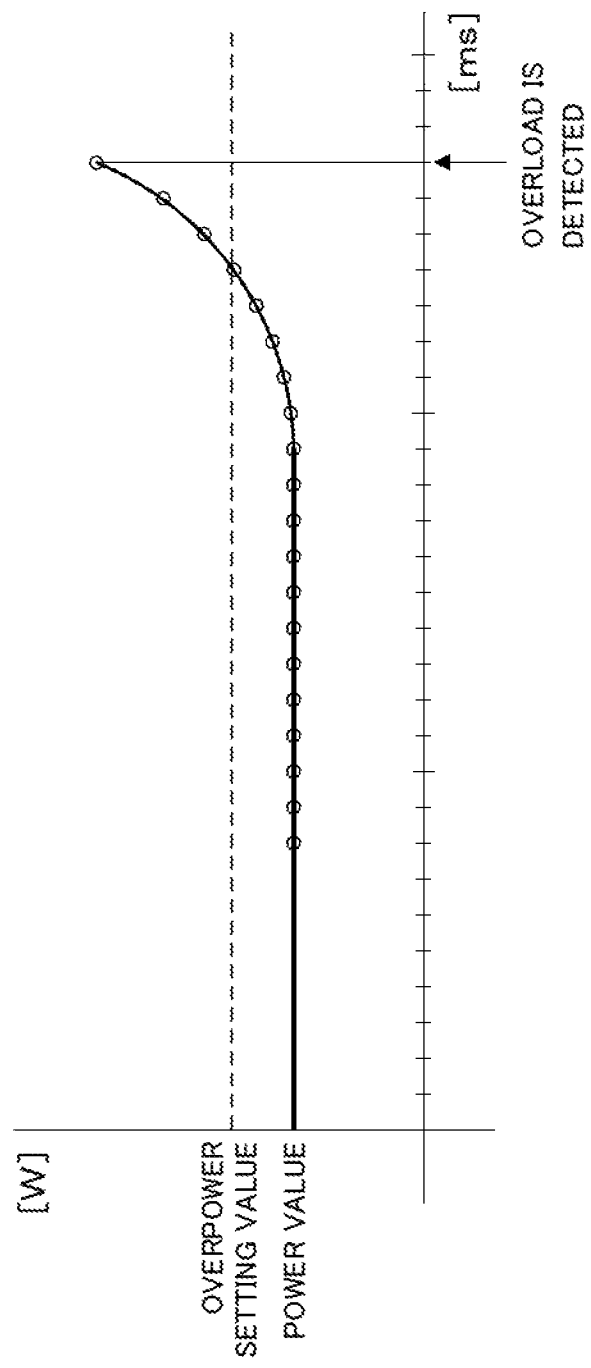
FIG. 8 is a conceptual diagram illustrating logs of power values obtained when overload is detected.

FIG. 7 is a schematic view illustrating one example of a threshold setting screen 7 while FIG. 8 is a conceptual diagram showing logs of power values obtained when overload is detected. The control unit 51 can transmit and receive information from and to an external computer through the communication unit 59. For example, the control unit 51 transmits structured data that can be displayed on a browser on the computer side to cause the browser to display a setting screen 7 for setting thresholds through which setting of various thresholds, a sampling interval of power, etc. can be accepted. Furthermore, the control unit 51 reads out log information obtained when overload is detected in response to the request from the computer, and transmits the read log information to the computer through the communication unit 59 to thereby cause the browser to display a graph showing the change in power obtained when overload occurs, etc.

The setting screen 7 is a browser image. The setting screen 7 includes a threshold input portion 71, a waveform display portion 72, a display switching button 73 and a waveform selection button 74.

The threshold input portion 71 is displayed at the left of the browser screen, and includes input fields for each accepting a power upper limit threshold to detect overload, such as "overpower setting 0" to "overpower setting 3", input fields for each accepting a time period at a start of the motor during which overload is not detected, such as "start time 0" to "start time 3," input fields for each accepting a duration during which a threshold crossing determined as overload is maintained, such as "shock time 0" to "shock time 3," an input field for accepting a temperature threshold such as "over heat setting," and an input field for accepting a vibration threshold such as "over impact setting". The user inputs thresholds to the respective input fields to thereby set the thresholds to the overload protection circuit 5. It is noted that the numerical values "0" to "3" correspond to the setting values of the threshold setting switch 58 which is a rotary switch. Note that the power lower limit threshold may also be accepted though only the power upper limit threshold is accepted in FIG. 7.

The waveform display portion 72 is a display unit for displaying in the waveform the logs of the power values immediately before overload is detected. More specifically, as illustrated in FIG. 8, displayed are the horizontal axis indicating time, the vertical axis indicating a power value, a broken line indicating a threshold to determine whether overpower occurs or not, and a waveform indicating a power value. The circles displayed on the waveform show power values detected at a sampling timing. Furthermore, the waveform display portion 72 can also display waveforms of the phase voltage, phase current, temperature, vibration and acceleration obtained when overload is detected.

Moreover, at the right of the setting screen 7, the display switching button 73 is displayed for switching the power waveform displayed on the waveform display portion 72 between a waveform of detection values detected in real time and a waveform of detection values detected immediately before overload occurs that are stored as logs. If the display switching button 73 is operated, the control unit 51 transmits any one of the information on the detection values detected in real time in response to operation and the information on the detection values stored in the log storing unit 56 to the computer through the communication unit 59.

In addition, at the right of the setting screen 7, the waveform selection button 74 is displayed for selecting the content to be displayed in the waveform format on the waveform display portion 72, for example, a "voltage" button, a "current" button, a "power" button, a "temperature" button, an "acceleration X axis" button, an "acceleration Y axis" button and an "acceleration Z axis" button. The control unit 51 transmits the log information on voltage, current, power, temperature and each acceleration stored in the log storing unit 56 to the computer through the communication unit 59 in accordance with a selected button.

According to the gear motor 1 thus configured, it is possible to accurately detect an abnormality in load related to the three-phase motor 2 or the driven device even in a light load area independent of variation in the power supply voltage.

Furthermore, the power detection circuit 53 and the control unit 51 are housed in the terminal box 4, which eliminates the need for disposing outside thereof an additional circuit device that may cause interference with the driven device, and enables miniaturization of the gear motor 1.

Moreover, power supplied to the three-phase motor 2 is calculated with a small circuit configuration without a transformer, which is a large component. This makes it possible to house the power detection circuit 53 in the terminal box 4 with a margin.

In addition, if a load abnormality is detected by detecting power, the circuit breaker 52 is set to an open state to thereby shut off the power supply to the three-phase motor 2.

Furthermore, if a load abnormality is detected by detecting power, a signal indicating an abnormality in load can be output to the outside.

Moreover, the vibration and the temperature of the gear motor 1 are detected together with the power supplied to the three-phase motor 2, whereby an abnormality in load can be detected more accurately. If a load abnormality is detected, the power supply to the three-phase motor 2 can be shut off.

Specifically, abnormality in vibration and temperature at the three-phase motor 2, the reduction gear 3, or the connected portion between the three-phase motor 2 and the reduction gear 3 are detected, so that a load abnormality can be detected.

Additionally, thresholds for detecting a load abnormality can be set by the threshold setting switch 58.

Furthermore, the user can assign a threshold for detecting a load abnormality to each of the setting values corresponding to the state of the threshold setting switch 58 through the communication unit 59, so that the user can easily switch the thresholds by switching the threshold setting switch 58 to select a desired setting value.

In addition, the multiple recent log information of voltage, current, power, vibration, temperature, etc. that are intermittently detected by the power detection circuit 53 are stored in the log storing unit 56, so that the user can confirm the state of power, vibration, temperature or the like immediately before a load abnormality occurs. More specifically, the log information of the power is important information to specify the cause of a load abnormality.

It is to be understood that the embodiments disclosed here is illustrative in all respects and not restrictive. The scope of the present invention is defined by the appended claims, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A motor device comprising a motor and a terminal box housing a connection terminal for connecting the motor to an alternating current power supply, comprising:
    a power detection circuit that detects power to be supplied to the motor; and
    a control unit that executes predetermined control if a load abnormality related to the motor or a driven device that is driven by the motor is detected based on power detected by the power detection circuit,
    wherein the power detection circuit and the control unit are housed in the terminal box,
    wherein the motor includes three-phase coils that are star-connected to three-phase alternating current power supply connection terminals,
    wherein the power detection circuit includes:
        three resistors that are star-connected to the three-phase alternating current power supply connection terminals;
        a voltage detection unit that detects voltage across one of the resistors corresponding to phase voltage of one of the coils; and
        a current detection unit that detects phase current flowing through the one of the coils, and
    wherein the control unit calculates power supplied to the motor based on the voltage across the one of the resistors and the phase current flowing through the one of the coils.

2. The motor device according to claim 1, further comprising a circuit breaker that shuts off power supply to the motor, wherein the control unit controls the circuit breaker to shut off power supply if a load abnormality is detected.

3. The motor device according to claim 1, wherein the control unit outputs a signal indicating an abnormality in load if a load abnormality is detected.

4. The motor device according to claim 1, further comprising:
- a vibration detection unit that detects vibration of the motor device;
- a temperature detection unit that detects temperature of the motor device; and
- a circuit breaker that shuts off power supply to the motor, wherein
- the control unit controls the circuit breaker to shut off power supply if power detected by the power detection circuit is above a predetermined power upper limit threshold or is below a power lower limit threshold, if vibration detected by the vibration detection unit is above a predetermined vibration threshold, or if temperature detected by the temperature detection unit is above a predetermined temperature threshold.

5. The motor device according to claim 1, further comprising a log storing unit that stores a plurality of recent power values intermittently detected by the power detection circuit.

6. A motor device comprising a motor and a terminal box housing a connection terminal for connecting the motor to an alternating current power supply, comprising:
- a power detection circuit that detects power to be supplied to the motor;
- a control unit that executes predetermined control if a load abnormality related to the motor or a driven device that is driven by the motor is detected based on power detected by the power detection circuit; and
- a vibration detection unit that detects vibration of the motor device, wherein
- the power detection circuit and the control unit are housed in the terminal box, and
- the control unit detects an abnormality of the motor device or a driven device that is driven by the motor based on a detection result of the vibration detection unit together with power detected by the power detection circuit.

7. The motor device according to claim 6, further comprising a reduction gear that is coupled to the motor, wherein
- the vibration detection unit is disposed at the motor, the reduction gear or a connected portion between the motor and the reduction gear.

8. A motor device comprising a motor and a terminal box housing a connection terminal for connecting the motor to an alternating current power supply, comprising:
- a power detection circuit that detects power to be supplied to the motor;
- a control unit that executes predetermined control if a load abnormality related to the motor or a driven device that is driven by the motor is detected based on power detected by the power detection circuit; and
- a temperature detection unit that detects temperature of the motor device, wherein
- the power detection circuit and the control unit are housed in the terminal box, and
- the control unit detects an abnormality of the motor device or a driven device that is driven by the motor based on a detection result of the temperature detection unit together with power detected by the power detection circuit.

9. The motor device according to claim 8, further comprising a reduction gear that is coupled to the motor, wherein the temperature detection unit is disposed at the motor, the reduction gear or a connected portion between the motor and the reduction gear.

10. A motor device comprising a motor and a terminal box housing a connection terminal for connecting the motor to an alternating current power supply, comprising:
- a power detection circuit that detects power to be supplied to the motor;
- a control unit that executes predetermined control if a load abnormality related to the motor or a driven device that is driven by the motor is detected based on power detected by the power detection circuit; and
- a threshold setting switch for setting a power upper limit threshold or a power lower limit threshold to detect overload or light load, wherein
- the power detection circuit and the control unit are housed in the terminal box, and
- the control unit detects a load abnormality by comparing a power upper limit threshold or a power lower limit threshold set by the threshold setting switch with power detected by the power detection circuit.

11. The motor device according to claim 10, further comprising:
- a communication unit that receives a plurality of power upper limit thresholds or a plurality of power lower limit thresholds set by the threshold setting switch; and
- a threshold storing unit that stores the plurality of power upper limit thresholds or the plurality of power lower limit thresholds received by the communication unit in association with setting values of the threshold setting switch, wherein
- the control unit detects a load abnormality by reading out from the threshold storing unit a power upper limit threshold or a power lower limit threshold corresponding to a setting value of the threshold setting switch, and comparing the power upper limit threshold or the power lower limit threshold that is read out with power detected by the power detection circuit.

* * * * *